US012669196B2

(12) United States Patent

Foucart-Gaudy et al.

(10) Patent No.: US 12,669,196 B2

(45) Date of Patent: Jun. 30, 2026

(54) AIRCRAFT AIR DUCT PIPE COMPRISING AT LEAST ONE PIPE COUPLING AND METHOD OF MANUFACTURING SAID PIPE

(71) Applicant: Airbus Operations SAS, Toulouse (FR)

(72) Inventors: Simon Foucart-Gaudy, Toulouse (FR); Vincent Delpy, Toulouse (FR); Gérard Millet, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 524 days.

(21) Appl. No.: 18/295,119

(22) Filed: Apr. 3, 2023

(65) Prior Publication Data

US 2023/0313915 A1 Oct. 5, 2023

(30) Foreign Application Priority Data

Apr. 5, 2022 (FR) ...................................... 2203071

(51) Int. Cl.
*F16L 11/08* (2006.01)
*F16L 9/12* (2006.01)
*F16L 59/07* (2006.01)

(52) U.S. Cl.
CPC ............... *F16L 11/08* (2013.01); *F16L 9/121* (2013.01); *F16L 59/07* (2013.01)

(58) Field of Classification Search
CPC ......... F16L 59/182; F16L 59/07; F16L 11/08; F16L 11/083; F16L 11/11; F16L 11/12; F16L 27/087; F16L 27/111; F16L 27/11; F16L 27/108; F16L 27/113; F16L 27/1133; F16L 27/1136
See application file for complete search history.

(56) References Cited

U.S. PATENT DOCUMENTS 471,266 A * 3/1892 Buscher ................. F16L 27/111
285/55
3,105,708 A * 10/1963 Esty ......................... F01N 3/043
285/299
3,232,640 A * 2/1966 Donkle, Jr. ............ F16L 27/111
73/40.7
4,204,707 A * 5/1980 Lincicome ............. F16L 27/111
138/139
4,791,963 A * 12/1988 Gronert ................... F16L 27/111
138/121

(Continued)

FOREIGN PATENT DOCUMENTS

EP 0891511 B1 7/2003
FR 2629892 A1 10/1989

OTHER PUBLICATIONS

French Search Report for French Patent Application No. 2203071 dated Oct. 20, 2022; priority document.

*Primary Examiner* — David Bochna

(74) *Attorney, Agent, or Firm* — Greer, Burns & Crain, Ltd.

(57) ABSTRACT

A pipe of an air duct including, from the interior toward the exterior, an internal layer, at least one insulating intermediate layer, an external layer and at least at one of its ends a pipe coupling distinct from the internal layer including a first end section that cooperates with the internal layer in sealed manner and a second end section not covered by any of the layers that is configured to cooperate with a connection system.

13 Claims, 3 Drawing Sheets

(56)                 References Cited

U.S. PATENT DOCUMENTS

| 4,911,206 | A | * | 3/1990 | Gropp | F16L 11/115 |
| | | | | | 138/121 |
| 5,702,109 | A | * | 12/1997 | Mahin | F16L 11/083 |
| | | | | | 277/340 |
| 7,104,285 | B2 | * | 9/2006 | Furuta | F16L 11/118 |
| | | | | | 138/131 |
| 2007/0137718 | A1 | * | 6/2007 | Rushlander | F16L 11/112 |
| | | | | | 138/121 |
| 2018/0209569 | A1 | * | 7/2018 | Tajiri | F16L 27/111 |

* cited by examiner

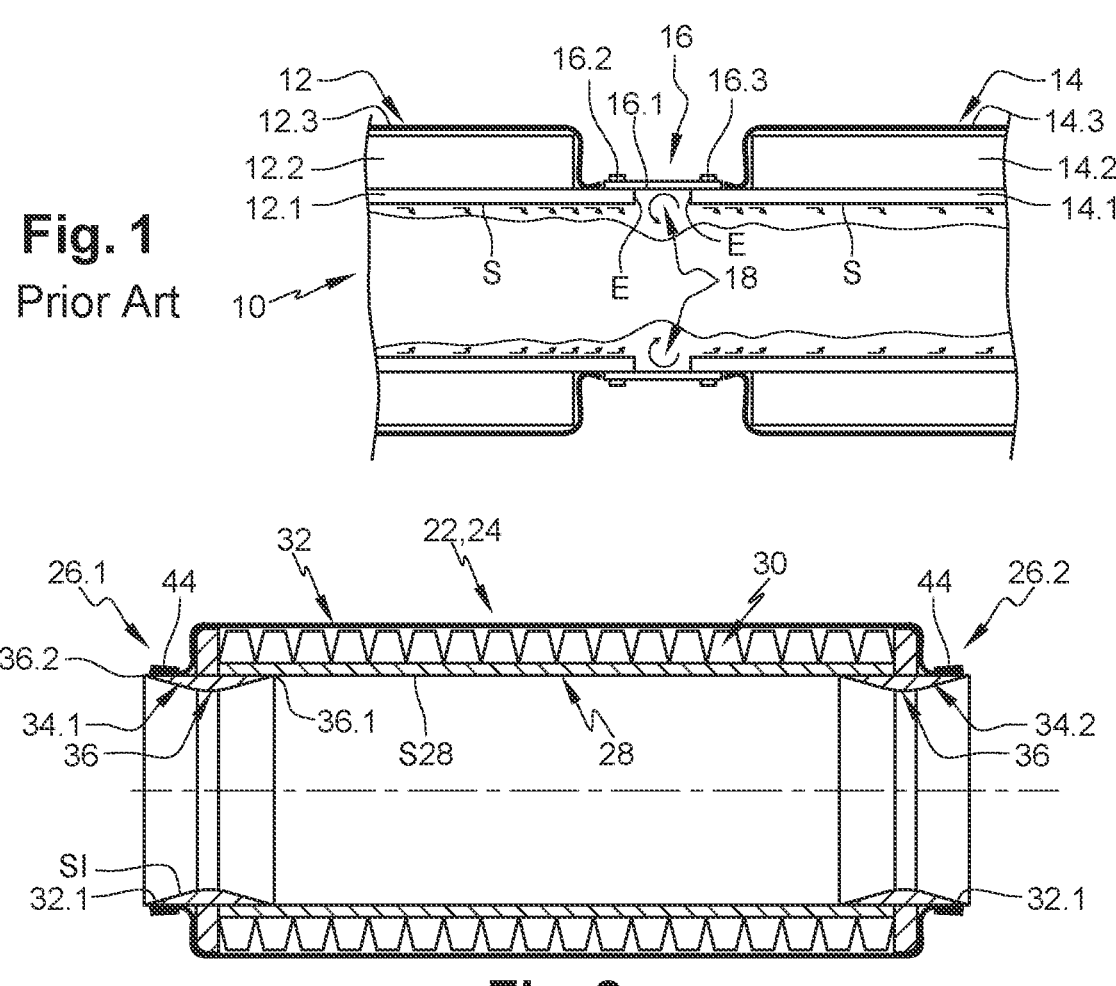
Fig. 1
Prior Art
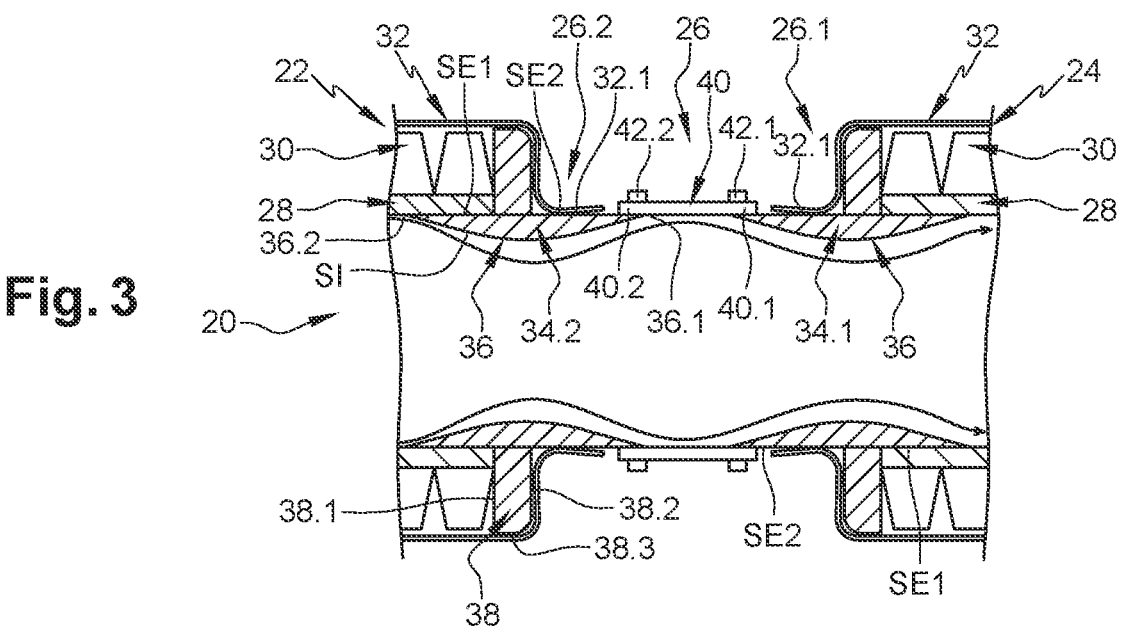
Fig. 2
Fig. 3

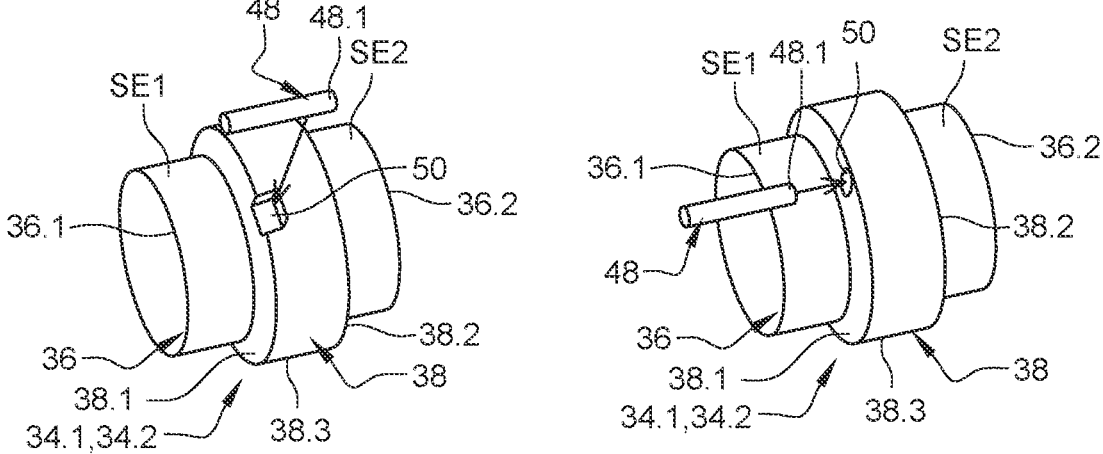
Fig. 8                    Fig. 9
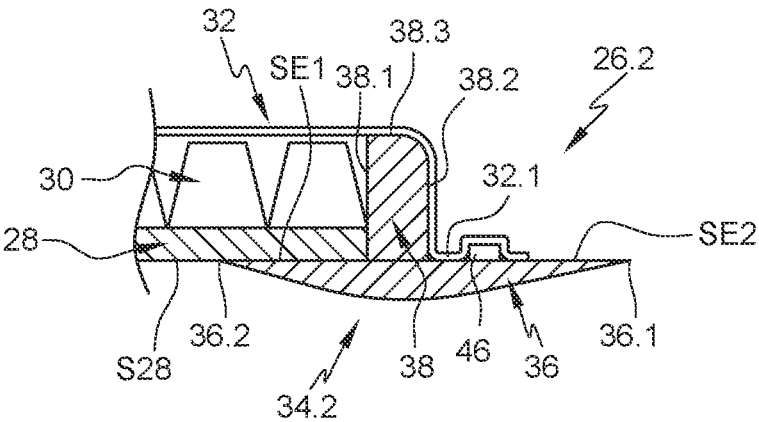
Fig. 10

AIRCRAFT AIR DUCT PIPE COMPRISING AT LEAST ONE PIPE COUPLING AND METHOD OF MANUFACTURING SAID PIPE

CROSS-REFERENCES TO RELATED APPLICATIONS

This application claims the benefit of the French patent application No. 2203071 filed on Apr. 5, 2021, the entire disclosures of which are incorporated herein by way of reference.

FIELD OF THE INVENTION

The present application relates to an aircraft air duct pipe comprising at least one pipe coupling and to a method of manufacturing said pipe.

BACKGROUND OF THE INVENTION

In one embodiment that can be seen in FIG. 1, a duct 10 comprises a plurality of pipes 12, 14 placed end-to-end, each pipe 12, 14 including an internal tube 12.1, 14.1, an insulating intermediate layer 12.2, 14.2 and an external layer 12.3, 14.3. Two pipes 12, 14 are connected by a connection system 16 that comprises a connection sleeve 16.1 fitted over the ends of the first and second internal tubes 12.1, 14.1 not covered by the insulating intermediate layers 12.2, 14.2 and the external layers 12.3, 14.3, a first clamp 16.2 clamping the connection sleeve 16.1 around the first internal tube 12.1 and a second clamp 16.3 clamping the connection sleeve 16.1 around the second internal tube 14.1.

At the level of the connection system 16 the first and second internal tubes 12.1, 14.1 have spaced edge surfaces E positioned in transverse planes. This arrangement generates aerodynamic disturbances 18 between the edge surfaces E, which generates head losses.

In one embodiment, to resist the compression forces exerted by the clamps 16.2, 16.3, each internal tube 12.1, 14.1 is made of a composite material and includes reinforcing fibers embedded in a resin matrix. In one implementation the internal tubes 12.1, 14.1 are produced by molding using bulky molds.

This embodiment is not satisfactory because the internal surface S of the internal tubes 12.1, 14.1 regularly features surface defects that may be generated during the manufacturing process or by damage after the manufacturing process. As depicted in FIG. 1, these surface defects generate head losses.

SUMMARY OF THE INVENTION

The present invention aims to remedy some or all of the disadvantages of the prior art.

To this end, the invention has for an object a pipe of an air duct extending between upstream and downstream ends and comprising an internal layer, at least one insulating intermediate layer mounted on the internal layer and an external layer mounted on the insulating intermediate layer, the upstream and/or downstream end(s) being configured to be connected to a connection system.

In accordance with the invention, the pipe comprises at its upstream and/or downstream end(s) a pipe coupling distinct from the internal layer, extending between first and second ends and including a first end section that extends from the first end and cooperates with the internal layer in a sealed manner and a second end section not covered by any of the layers that extends from the second end and is configured to cooperate with the connection system. In a complementary way, the pipe comprises upstream and downstream pipe couplings positioned at the level of the upstream and downstream ends of the pipe, and a plurality of longitudinal stiffeners connecting the upstream and downstream pipe couplings positioned between the internal and external layers.

In contrast to the prior art, no clamp of the connection system exerts a compression force on the internal layer of the pipe. Consequently, this internal layer need not be reinforced by fibers and may be produced without it being necessary to use a complex, bulky and costly mold.

In accordance with another feature, the pipe coupling comprises:

a tubular body that extends between the first and second ends and has an interior surface oriented toward the interior of the pipe and first and second exterior surfaces opposite the interior surface, a flange fastened to the tubular body, projecting relative to the first and second exterior surfaces, at a distance from the first and second ends, and separating the first and second exterior surfaces, the first exterior surface forming at least a part of the first end section onto which is fitted the internal layer, the second exterior surface forming at least a part of the second end section configured to cooperate with the connection system.

In accordance with another feature, the first and/or second end(s) of the tubular body has or have a bevel shape.

In accordance with another feature, the interior surface has, from the first end to the second end, a convergent frustoconical shape and then a divergent frustoconical shape.

In accordance with another feature, the flange has a first annular face oriented toward the first end of the tubular body, a second annular face parallel to the first annular face and oriented toward the second end of the tubular body, and a peripheral face connecting the first and second annular faces, the second annular face and the peripheral face being connected by a radius of curvature having a diameter greater than 2 mm.

In accordance with another feature, the flange of the pipe coupling has a height substantially equal to the sum of the thicknesses of the internal layer and of the insulating intermediate layer(s).

In accordance with another feature, the external layer comprises at least one end section surrounding the second exterior surface of the pipe coupling, at a distance from the second end and connected by a sealed connection to the second exterior surface.

In accordance with another feature, the external layer is a shrink film.

In accordance with another feature, the internal layer is made from an extruded or laminated polymer.

In accordance with another feature, the internal layer, the insulating intermediate layer and the external layer are flexible layers.

The invention equally has for an object a method of manufacturing a pipe as described above. In accordance with the invention, the method comprises a step of cutting an internal layer to a required length, a step of assembling the internal layer and at least one pipe coupling by fitting the internal layer onto the first end section of the pipe coupling and connecting them in sealed manner, a step of placing at least one insulating intermediate layer around the internal layer and a step of placing an external layer around the insulating intermediate layer and joining in sealed manner the external layer and the pipe coupling.

BRIEF DESCRIPTION OF THE DRAWINGS

Other features and advantages will emerge from the following description of the invention given by way of example only with reference to the appended drawings, in which:

FIG. 1 is a longitudinal section of a part of an air duct depicting a prior art embodiment, FIG. 2 is a longitudinal section of an air duct pipe depicting one embodiment of the invention, FIG. 3 is a longitudinal section of a part of an air duct depicting one embodiment of the invention, FIG. 8 is a perspective view of an assembly of a pipe coupling and a stiffener depicting a first variant of the invention, FIG. 9 is a perspective view of an assembly of a pipe coupling and a stiffener depicting a second variant of the invention, and FIG. 10 is a longitudinal section of one end of a pipe depicting an embodiment of the invention.

DETAILED DESCRIPTION OF THE PREFERRED EMBODIMENTS

Figures 4, 5, 6, 7:
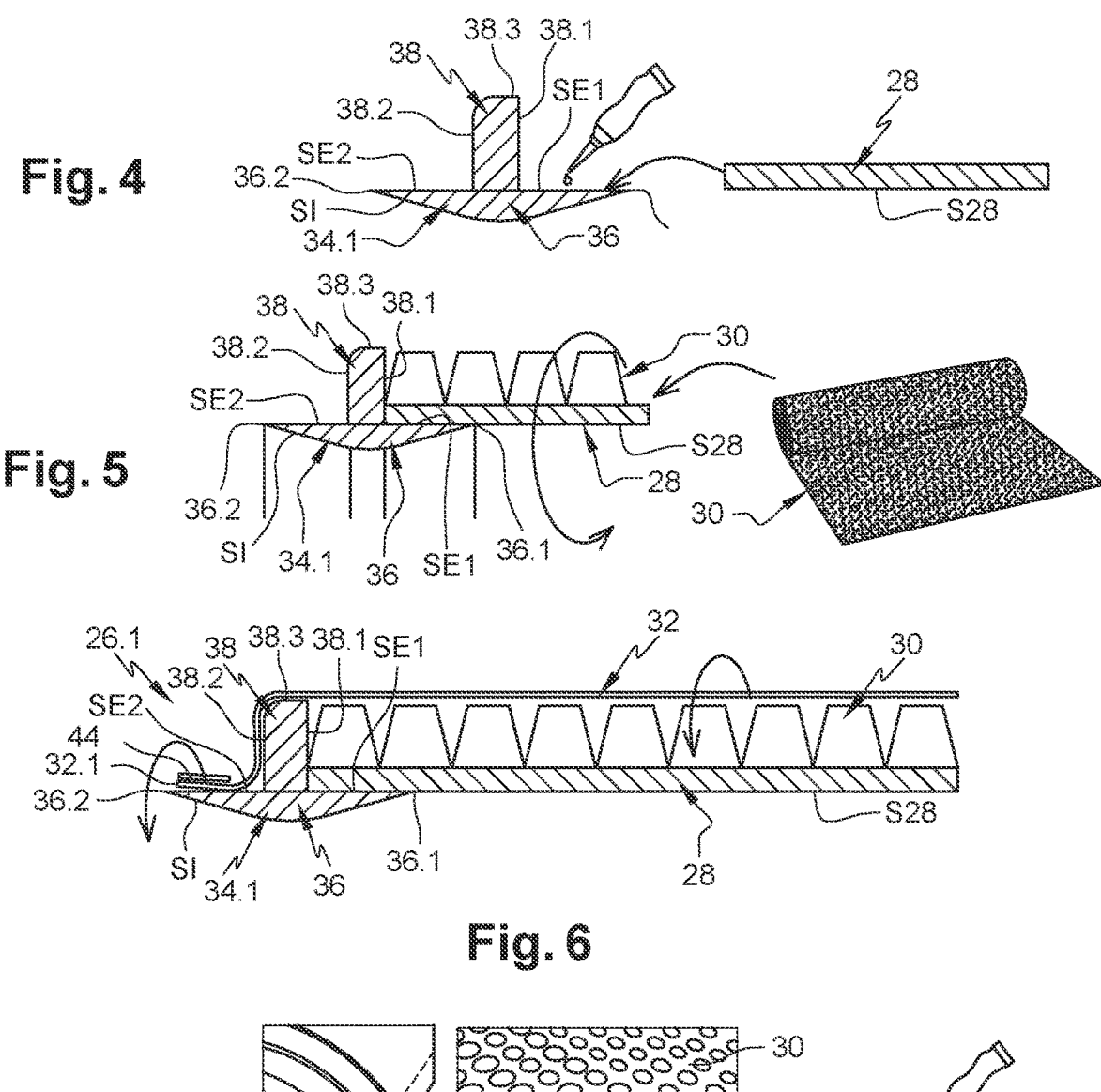
FIG. 4 is a diagrammatic representation of a step of assembling an internal layer and a pipe coupling depicting one embodiment of the invention.
FIG. 5 is a diagrammatic representation of a step of installing an insulating intermediate layer depicting one embodiment of the invention.
FIG. 6 is a diagrammatic representation of a step of installing an externa layer depicting one embodiment of the invention.
FIG. 7 is a diagrammatic representation of a part of an air duct pipe depicting another embodiment of the invention.

As depicted in FIG. 3, an air duct 20 comprises at least two pipes 22, 24 positioned end-to-end and interconnected by a connection system 26.

According to one application the air duct 20 is an aircraft conditioned-air duct.

Although depicted with rectilinear trajectories, the pipes 22, 24 could follow a curved trajectory.

As depicted in FIG. 2, each pipe 22, 24 has an upstream end 26.1 and a downstream end 26.2, the downstream end 26.2 of a first pipe 22 and the upstream end 26.1 of a second pipe 24 being connected by the connection system 26. In one application only one of the upstream or downstream ends 26.1, 26.2 is configured to be connected to a connection system 26.

Each of the first and second pipes 22, 24 comprises an internal layer 28, at least one insulating intermediate layer 30 applied to the internal layer 28 and an external layer 32 applied to the insulating intermediate layer 30.

At least one pipe 22, 24 has at least one pipe coupling 34.1, 34.2 at least at one of its ends and distinct from the internal layer 28.

In a configuration that can be seen in FIG. 2 the pipe 24 comprises an upstream pipe coupling 34.1 at the level of its upstream end 26.1 and a downstream pipe coupling 34.2 at the level of its downstream end 26.2.

In one embodiment the upstream and downstream pipe couplings 34.1, 34.2 are identical.

Each pipe coupling 34.1, 34.2 comprises:

a tubular body 36 that extends between first and second ends 36.1, 36.2 and has an interior surface SI oriented toward the center of the pipe and first and second exterior surfaces SE1, SE2 opposite the interior surface, a flange 38 fastened to the tubular body 36, projecting relative to the first and second exterior surfaces SE1, SE2, at a distance from the first and second ends 36.1, 36.2 and separating the first and second exterior surfaces SE1, SE2.

The flange 38 has a first annular face 38.1 oriented toward the first end 36.1 of the tubular body 36, a second annular face 38.2 parallel to the first annular face 38.1 and oriented toward the second end 36.2 of the tubular body 36 and a peripheral face 38.3 connecting the first and second annular faces 38.1, 38.2.

In one configuration the second annular face 38.2 and the peripheral face 38.3 are connected with a large diameter radius of curvature, greater than 2 mm, in such a manner as to form a curved zone connecting the second annular face 38.2 and the peripheral face 38.3.

The first exterior surface SE1 of the pipe coupling 34.1, 34.2 cooperates with the internal layer 28. The latter has an interior surface S28 fitted around the first exterior surface SE1. Thus, the first exterior surface SE1 has a cross-section identical to the section of the interior surface S28 of the internal layer 28. In one arrangement the internal layer 28 is in contact with the first annular face 38.1 of the flange 38.

The second exterior surface SE2 of the pipe coupling 34.1, 34.2 is configured to cooperate with a connection system 26.

Alternatively, the pipe coupling 34.1, 34.2 need not comprise a flange 38. The latter favors the positioning of the internal layer 28 relative to the pipe coupling 34.1, 34.2, the internal layer 28 coming to abut against the flange 38.

Whatever the embodiment, the pipe coupling 34.1, 34.2 comprises a first end section that extends from the first end 36.1 and cooperates with the internal layer 28 in such a manner as to obtain a sealed connection between said first end section and the internal layer 28 and a second end section that extends from the second end 36.2, is not covered by the layers 28, 30, 32 and is configured to cooperate with a connection system 26.

The first and/or second end(s) 36.1, 36.2 has or have a bevel shape. Thus, the interior surface SI and the first exterior surface SE1 join at the level of the first end 36.1 forming a circular edge and/or the interior surface SI and the second exterior surface SE2 join at the level of the second end 36.2 forming a circular edge. These shapes enable limitation of disturbances to the flow of air circulating in the duct 20.

In one configuration the interior surface SI has, from the first end 36.1 to the second end 36.2, a convergent frusto-conical shape followed by a divergent frustoconical shape. Thus, the interior surface SI has the shape of a diabolo. This configuration contributes to attenuating the disturbances to the flow of air circulating in the duct 20.

In accordance with another particular feature, the interior surface SI has as smooth as possible a surface state.

In one configuration the first and second exterior surfaces SE1, SE2 have identical circular cross-sections. Of course, the invention is not limited to those cross-sections. The latter may be elliptical, oval, polygonal, etc.

In one embodiment the connection system 26 comprises a connection sleeve 40 that has a first section 40.1 fitted over the second exterior surface SE2 of the downstream connection nozzle 34.2 of the first pipe 22 and a second section 40.2 fitted over the second exterior surface SE2 of the upstream pipe coupling 34.1 of the second pipe 24, a first clamp 42.1 clamping the first section 40.1 onto the second exterior surface SE2 of the downstream pipe coupling 34.2 and a second clamp 42.2 clamping the second section 40.2 onto the second exterior surface SE2 of the upstream pipe coupling 34.1.

Thus, in contrast to the prior art, the clamps 42.1, 42.2 do not exert compression forces on the interior layers 28 of the pipes 22, 24. Consequently, the latter do not need to be reinforced with fibers. Thus, it is no longer necessary to use complex and bulky molds to produce the internal layers 28 of the pipes or to use ovens or autoclaves for their polymerization, which enables reduction of manufacturing costs.

In one embodiment the internal layer 28 is made from an extruded or laminated polymer. These embodiments enable an interior surface S28 to be obtained for the internal layer 28 that has the smoothest possible surface state. This solution makes it possible to limit the presence of surface defects and disturbances to the flow of air circulating in the duct 20.

In one embodiment the internal layer 28 is made of methyl methacrylate, polyether ketone (PEEK), acrylonitrile butadiene styrene (ABS), high-density polyurethane, etc. This list is of course not exhaustive.

In accordance with a first embodiment that can be seen in FIGS. 2 to 6 the internal layer 28 is a rigid tube. In this case its interior surface S28 has a cross-section identical to that of the first exterior surface SE1 of the upstream and downstream pipe couplings 34.1, 34.2 provided at each end of the pipe 22, 24.

In accordance with another embodiment that can be seen in FIG. 7 the internal layer 28 is flexible.

In one embodiment the method of manufacturing the pipe comprises a step of cutting the internal layer 28 to a required length. In one implementation, in the case of a rigid tube, the internal layer 28 is paid out to the required length in a much longer tube.

The internal layer 28 is connected in sealed manner at each of its ends to a pipe coupling 34.1, 34.2.

In one embodiment, the method of manufacturing the pipe comprises a step of assembling the internal layer 28 with at least one pipe coupling 34.1, 34.2 by fitting the internal layer 28 over the first end section of the pipe coupling 34.1, 34.2 and connecting them in sealed manner. In an implementation that can be seen in FIG. 4 this assembly is obtained by gluing. Thus, the internal layer 28 is glued all around the circumference of the first exterior surface SE1 of the pipe coupling 34.1, 34.2.

In one configuration the internal layer 28 is connected to a pipe coupling 34.1, 34.2 at each of its ends.

In accordance with a first variant each pipe 22, 24 comprises one or more intermediate layers of bubble-layer type.

In accordance with a second variant each pipe 22, 24 comprises one or more intermediate layers of plastic material honeycomb type.

In accordance with another variant, each pipe 22, 24 comprises an intermediate layer of grid type and an insulating intermediate layer of bubble-layer type.

Of course, the invention is not limited to these variants of the insulating intermediate layer 30.

Depending on the embodiment, the insulating intermediate layer 30 may be flexible, semi-rigid or rigid.

In one arrangement the flange 38 of the pipe coupling 34.1, 34.2 has a height (the distance separating the first exterior surface SE1 and the peripheral face 38.3) substantially equal to the sum of the thicknesses of the internal layer 28 and the insulating intermediate layer or layers 30.

In one embodiment, the method of manufacturing the pipe comprises a step of placing at least one insulating intermediate layer 30 around the internal layer 28. In one technique each insulating intermediate layer 30 is wound around the internal layer 28.

The external layer 32 is an airtight layer and connected in sealed manner to at least one of the pipe couplings 34.1, 34.2 around all of its circumference. In one configuration the external layer 32 is connected in sealed manner to each of the upstream, downstream pipe couplings 34.1, 34.2 around all their circumference. This external layer 32 makes it possible to prevent the appearance of moisture between the internal and external layers 28, 32.

In a first configuration that can be seen in FIG. 6 the external layer 32 comprises at least one end section 32.1 surrounding the second exterior surface SE2 of the pipe coupling 34.1, 34.2, at a distance from the second end 36.2 and connected by a sealed connection to the second exterior surface SE2. In one embodiment, the sealed connection comprises an adhesive tape 44 around the end section 32.1 of the external layer 32 around the second exterior surface SE2 of the pipe coupling 34.1, 34.2. Additionally or alternatively, the sealed connection comprises a seal 46 between the end section 32.1 of the external layer 32 and the second exterior surface SE2 of the pipe coupling 34.1, 34.2.

In one implementation, the method of manufacturing the pipe comprises a step of fitting the external layer 32 around the insulating intermediate layer 30 and a part of at least one pipe coupling 34.1, 34.2 and joining in sealed manner the external layer and the pipe coupling 34.1, 34.2 around all of its circumference.

In another configuration, the external film 32 is a shrink film. In one implementation, during the step of fitting the external layer 32, the latter is wrapped onto the insulating intermediate layer 30 and a part of each of the pipe couplings 34.1, 34.2.

In one embodiment, the internal layer 28 and/or the insulating intermediate layer 30 is or are rigid to confer its rigidity on the pipe 22, 24.

In another embodiment that can be seen in FIGS. 7 to 9, the pipe 22, 24 comprises a plurality of longitudinal stiffeners 48 connecting the upstream and downstream pipe couplings 34.1, 34.2, positioned between the internal and external layers 28, 32. These longitudinal stiffeners 48 are made of composite material and take the form of solid or hollow profiled members.

Each longitudinal stiffener 48 has a first end 48.1 connected to the upstream pipe coupling 34.1 and a second end 48.2 connected to the downstream pipe coupling 34.2.

Each of the pipe couplings 34.1, 34.2 comprises a housing 50 for each of the ends 48.1, 48.2 of each of the longitudinal stiffeners 48.

In a first variant that can be seen in FIG. 8, each housing 50 is open at the level of the first annular face 38.1 and of the peripheral face 38.3. In this first variant, each longitudinal stiffener 48 can be introduced into its housing 50 by moving it in a radial direction parallel to the first annular face 38.1.

In a second variant that can be seen in FIG. 8, each housing 50 is open at the level of the first annular face 38.1 alone and is at a distance from the peripheral face 38.3. In one configuration, each longitudinal stiffener 48 and its housing 50 have identical cross-sections. In this second variant, each longitudinal stiffener 48 is introduced into its housing 50 by moving it in an axial direction perpendicular to the first annular face 38.1.

When longitudinal stiffeners are present the various layers, namely the internal layer 28, the insulating intermediate layer 30 and the external layer 32, may be flexible, which makes it possible to reduce the overall size of the various layers when they are stored. Moreover, the thickness of the internal layer 28 may be minimized, which makes it possible to reduce the onboard weight.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A pipe of an air duct extending between upstream and downstream ends and comprising:

an internal layer, at least one insulating intermediate layer mounted on the internal layer, and an external layer mounted on the insulating intermediate layer, at least one of the upstream or downstream ends being configured to be connected to a connection system, wherein the pipe comprises an upstream pipe coupling positioned at a level of the upstream end and a downstream pipe coupling positioned at a level of the downstream end, such that the upstream and downstream pipe couplings are distinct from the internal layer, wherein each of the upstream and downstream pipe couplings include a tubular body which extends between first and second ends and has a first end section that extends from the first end and cooperates with the internal layer in sealed manner and a second end section not covered by any of the layers that extends from the second end and is configured to cooperate with the connection system, wherein an interior surface of the tubular body is oriented toward a central axis of the pipe, such that the tubular body increases in thickness between each of the first and second ends and a central portion of the interior surface, and wherein the pipe comprises a plurality of longitudinal stiffeners connecting the upstream and downstream pipe couplings positioned between the internal and external layers.

2. The pipe according to claim 1, wherein the pipe coupling comprises:

a flange fastened to the tubular body, projecting relative to the first and second exterior surfaces, at a distance from the first and second ends, and separating the first and second exterior surfaces, the first exterior surface forming at least a part of the first end section onto which is fitted the internal layer, the second exterior surface forming at least a part of the second end section configured to cooperate with the connection system, wherein the tubular body has first and second exterior surfaces opposite the interior surface.

3. The pipe according to claim 2, wherein at least one of the first or second ends of the tubular body has or have a bevel shape.

4. The pipe according to claim 3, wherein the interior surface has, from the first end to the second end, a convergent frustoconical shape and then a divergent frustoconical shape.

5. The pipe according to claim 2, wherein the flange has a first annular face oriented toward the first end of the tubular body, a second annular face parallel to the first annular face and oriented toward the second end of the tubular body, and a peripheral face connecting the first and second annular faces, the second annular face and the peripheral face being connected by a radius of curvature having a diameter greater than 2 mm.

6. The pipe according to claim 2, wherein the flange of the pipe coupling has a height substantially equal to a sum of a thicknesses of the internal layer and of the insulating intermediate layer.

7. The pipe according to claim 2, wherein the external layer comprises at least one end section surrounding the second exterior surface of the pipe coupling, at a distance from the second end and connected by a sealed connection to the second exterior surface.

8. The pipe according to claim 1, wherein the external layer is a shrink film.

9. The pipe according to claim 1, wherein the internal layer is made from an extruded or laminated polymer.

10. The pipe according to claim 1, wherein the internal layer, the insulating intermediate layer and the external layer are flexible layers.

11. A method of manufacturing a pipe according to claim 1, wherein the method comprises:

a step of cutting an internal layer to a required length, a step of assembling the internal layer and at least one pipe coupling by fitting the internal layer onto the first end section of the pipe coupling and connecting them in sealed manner, a step of placing at least one insulating intermediate layer around the internal layer, and a step of placing an external layer around the insulating intermediate layer and joining in sealed manner the external layer and the pipe coupling.

12. The pipe according to claim 1, wherein the interior surface has, from the first end to the second end, a convergent frustoconical shape and then a divergent frustoconical shape.

13. A pipe of an air duct extending between upstream and downstream ends and comprising:

an internal layer, at least one insulating intermediate layer mounted on the internal layer, and an external layer mounted on the insulating intermediate layer, wherein the external layer is a shrink film, at least one of the upstream or downstream ends being configured to be connected to a connection system, wherein the pipe comprises an upstream pipe coupling positioned at a level of the upstream end and a downstream pipe coupling positioned at a level of the downstream end, such that the upstream and downstream pipe couplings are distinct from the internal layer, wherein each of the upstream and downstream pipe couplings extend between first and second ends and include a first end section that extends from the first end and cooperates with the internal layer in sealed manner and a second end section not covered by any of the layers that extends from the second end and is config- ured to cooperate with the connection system, and wherein the pipe comprises a plurality of longitudinal stiffeners connecting the upstream and downstream pipe couplings positioned between the internal and external layers.

* * * * *